(12) United States Patent
Hu et al.

(10) Patent No.: US 10,795,203 B2
(45) Date of Patent: Oct. 6, 2020

(54) REFLECTIVE LIQUID CRYSTAL DISPLAY DEVICE HAVING A COMPOSITE LAYER FORMED ON A SIDE OF THE BACKLIGHT UNIT AWAY FROM THE DISPLAY PANEL

(71) Applicants: Beijing BOE Display Technology Co., Ltd., Beijing (CN); BOE Technology Group Co., Ltd., Beijing (CN)

(72) Inventors: Weipin Hu, Beijing (CN); Xibin Shao, Beijing (CN); Dan Wang, Beijing (CN); Xiao Sun, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/398,823

(22) Filed: Apr. 30, 2019

(65) Prior Publication Data
US 2020/0012148 A1    Jan. 9, 2020

(30) Foreign Application Priority Data

Jul. 6, 2018 (CN) .......................... 2018 1 0736666

(51) Int. Cl.
    G02F 1/1335   (2006.01)
    F21V 8/00     (2006.01)
    G02F 1/13357  (2006.01)

(52) U.S. Cl.
    CPC ..... *G02F 1/133553* (2013.01); *G02B 6/0056* (2013.01); *G02F 1/133528* (2013.01); *G02F 1/133606* (2013.01)

(58) Field of Classification Search
    CPC combination set(s) only.
    See application file for complete search history.

(56) References Cited

U.S. PATENT DOCUMENTS

| | | | |
|---|---|---|---|
| 2004/0017529 A1* | 1/2004 | Choi | G02F 1/133605 349/114 |
| 2011/0075070 A1* | 3/2011 | Kitagawa | G02F 1/133504 349/64 |

* cited by examiner

*Primary Examiner* — Lauren Nguyen
(74) *Attorney, Agent, or Firm* — Thomas | Horstemeyer LLP

(57) ABSTRACT

A reflective liquid crystal display panel includes a first substrate, a second substrate, a first polarizer disposed on a side of the first substrate away from the second substrate, a second polarizer disposed on a side of the second substrate away from the first substrate, liquid crystals, a light guiding plate disposed on a side of the first polarizer away from the first substrate, and a side-entry backlight. The reflective liquid crystal display panel further includes a third polarizer laminated on a side of the light guiding plate away from the first polarizer, a composite layer having a mixture of liquid crystals and dichroic dyes, and a third substrate. The third polarizer has the same polarization direction as the first polarizer and a light absorption axis of the third polarizer is orthogonal to a light absorption axis of the composite layer in a display dark state.

15 Claims, 4 Drawing Sheets

REFLECTIVE LIQUID CRYSTAL DISPLAY DEVICE HAVING A COMPOSITE LAYER FORMED ON A SIDE OF THE BACKLIGHT UNIT AWAY FROM THE DISPLAY PANEL

CROSS REFERENCE TO RELATED APPLICATION

The present disclosure claims the benefit of and priority to Chinese Patent No. 201810736666.1, filed on Jul. 6, 2018, the entire contents of which are incorporated by reference.

TECHNICAL FIELD

The present disclosure relates to the field of display technology, and more particularly to a reflective liquid crystal display panel, a manufacturing method thereof, and a display device.

BACKGROUND

Reflective display devices rely on reflecting ambient light to provide a display light source and, since the brightness of which is too low when the ambient light is weak, such products have a limited range of application. Providing a front-mounted light source can improve the user experience for the RLCD (reflective LCD) in a dark state, improve the quality appearance of the product, increase the added value of the product, and significantly improve the side effect of the product. Taking an e-book as an example, the price of a product with a front-mounted light source is generally twice of that having no front-mounted light source. Presently, there are few reflective LCD products with front light at major exhibitions at home and abroad. The main bottleneck is low contrast.

SUMMARY

The present disclosure provides a reflective liquid crystal display panel, a manufacturing method thereof, and a display device.

An aspect of the present disclosure provides a reflective liquid crystal display panel. The reflective liquid crystal display panel includes a first substrate and a second substrate disposed opposite to each other, a first polarizer disposed on a side of the first substrate away from the second substrate, a second polarizer disposed on a side of the second substrate away from the first substrate, liquid crystals filled between the first substrate and the second substrate, a light guiding plate having light guiding dots disposed on a side of the first polarizer away from the first substrate, a side-entry backlight and a third polarizer laminated on a side of the light guiding plate away from the first polarizer and having the same polarization direction as the first polarizer, a composite layer having a mixture of liquid crystals and dichroic dyes, and a third substrate. A light absorption axis of the third polarizer is orthogonal to a light absorption axis of the composite layer in a display dark state.

In an embodiment according to the present disclosure, a low-refractive-index layer is further disposed between the light guiding plate and the third polarizer, and the low-refractive-index layer has a refractive index lower than a refractive index of the light guiding plate.

In another embodiment according to the present disclosure, the light guiding plate is a glass light guiding plate.

In another embodiment according to the present disclosure, the third polarizer has a microstructure to eliminate reflection.

In another embodiment according to the present disclosure, the dichroic dyes are p-type dyes or n-type dyes.

In another embodiment according to the present disclosure, the liquid crystals in the composite layer are positive liquid crystals or negative liquid crystals.

Another aspect according to the present disclosure provides a method for manufacturing a reflective display panel. The method includes steps of: providing a first substrate; providing a second substrate opposite to the first substrate; providing a first polarizer on a side of the first substrate away from the second substrate; providing a second polarizer on a side of the second substrate away from the first substrate; filling liquid crystals between the first substrate and the second substrate; providing a light guiding plate having light guiding dots on a side of the first polarizer away from the first substrate; providing a third polarizer on a side of the light guiding plate away from the first polarizer; providing a composite layer having liquid crystals and dichroic dyes on a side of the third polarizer away from the light guiding plate; providing a third substrate on a side of the composite layer away from the third polarizer; and providing a side-entry backlight. The third polarizer has the same polarization direction as the first polarizer and in a display dark state, and a light absorption axis of the third polarizer is orthogonal to a light absorption axis of the composite layer.

In an embodiment according to the present disclosure, the method further includes a step of providing a low-refractive-index layer between the light guiding plate and the third polarizer before the step of disposing the third polarizer, wherein the low-refractive-index layer has a refractive index lower than a refractive index of the light guiding plate.

In another embodiment according to the present disclosure, the method further includes a step of performing a sanding treatment on the third polarizer before the step of disposing the third polarizer.

Another aspect of the present disclosure also provides a display device that includes the reflective liquid crystal display panel described above.

In the present disclosure, by providing a polarizer and a dichroic dye composite layer over the light guiding plate, the light absorption axis of the polarizer over the light guiding plate is orthogonal to the absorption axis of the dichroic dye composite layer in the display dark state. In this fashion, the escape of light on the surface of the light guiding plate can be eliminated, and the contrast of a reflective liquid crystal display panel can be greatly improved.

BRIEF DESCRIPTION OF THE DRAWINGS

The above and other features and advantages of the present disclosure will become more apparent from the detailed description of the exemplary embodiments with reference to the accompanying drawings.

DETAILED DESCRIPTION

Figure 1:
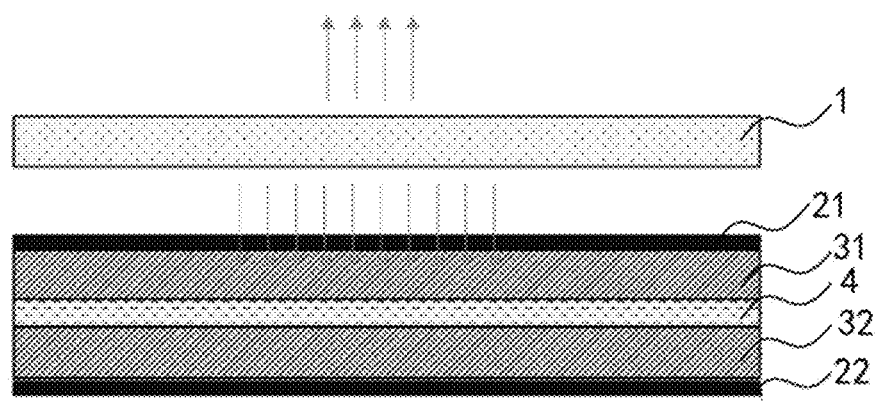
FIG. 1 is a schematic view of a conventional reflective liquid crystal display panel.

Example embodiments will now be described more fully with reference to the accompanying drawings. However, the example embodiments can be embodied in a variety of forms and should not be construed as being limited to the embodiments set forth herein. Rather, these embodiments are provided to make the present disclosure thorough and complete, and to fully convey the concept of the embodiments to those skilled in the art. In the figures, for clarity, the thickness of the regions and layers may be exaggerated. The same reference numerals in the drawings denote the same or similar structures, and thus their detailed description will be omitted.

It should be noted that the terms "on and under" in the present disclosure are merely relative concepts or reference to the normal operation state of the product, and should not be considered as limiting. When a layer or an element is referred to as being "between" two layers or two elements, it can be the only one layer between the two layers or the two elements, or more than one intermediate layer or element may exist therein.

FIG. 1 is a schematic view showing the structure of a conventional reflective LCD. The reflective LCD includes a light guiding plate 1, a first polarizer 21, a second polarizer 22, a first substrate 31, a second substrate 32, and liquid crystals 4. A front light guiding plate 1 is placed above the LCD. The front light guiding plate 1 is basically an acrylic plate of an optical grade having light guiding dots. When light is incident on each light guiding dot, reflected light may spread at various angles and is emitted out toward the display breaking reflective condition. There is an escape light at a side of the light guiding plate 1 away from the display. For the escape light, in a non-reflective liquid crystal display panel, a reflective sheet may be provided at the side of the escape light of the light guiding plate 1, to reflect the escape light back to the light guiding plate. However, in a reflective liquid crystal display panel, providing a reflective sheet is apparently inapplicable, resulting in low contrast in a conventional reflective device. The presence of escape light in a display dark state may seriously affect the contrast of the reflective display product.

Figure 2:
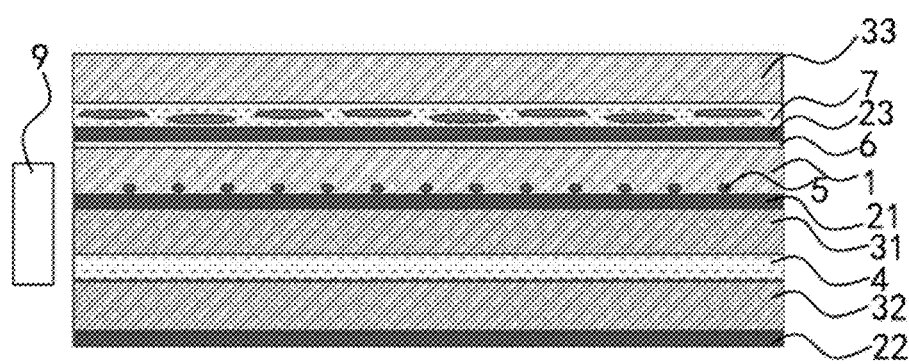
FIG. 2 is a schematic view of a reflective liquid crystal display panel according to one or more embodiments of the present disclosure.

FIG. 2 is a schematic view of a reflective liquid crystal display panel according to one or more embodiments of the present disclosure. As shown in FIG. 2, the reflective liquid crystal display panel includes a first substrate 31 and a second substrate 32, a first polarizer 21 disposed on a side of the first substrate 31 away from the second substrate 32, a second polarizer 22 on a side of the second substrate 32 away from the first substrate 31, liquid crystals 4 filled between the first substrate 31 and the second substrate 32, a side-entry backlight 9, a light guiding plate 1 having light guiding dots 5 disposed on a side of the first polarizer 21 away from the first substrate 31, a third polarizer 23 laminated on the side of the light guiding plate 1 away from the first polarizer 21, a composite layer 7 having liquid crystals and dichroic dyes, and a third substrate 33. The third polarizer 23 has the same polarization direction as the first polarizer 21. A light absorption axis 8 of the third polarizer 23 is orthogonal to a light absorption axis 8 of the composite layer 7 in the display dark state.

For example, the first substrate 31 and the second substrate 32 may be an opposite substrate and an array substrate, respectively. For example, the opposite substrate may be a color filter substrate. The array substrate includes pixel driving circuits arranged in an array, and each pixel driving circuit is configured to, for example, drive one pixel to control a voltage difference between electrodes in the corresponding pixel, thereby realizing display. Since light is incident from the front surface of the reflective liquid crystal display panel, the first substrate 31 is a transparent substrate, for example, a glass substrate. Liquid crystals 4 are filled between the first substrate 31 and the second substrate 32.

The light guiding plate 1 has light guiding dots 5 on the side adjacent to the first polarizer 21, and the light guiding dots 5 serve as a light extraction unit to take out the total reflected light, thereby improving the uniformity and brightness of the light emitted out.

The upper side of the light guiding plate 1 may also be deposited with a low-refractive-index layer 6, which has a lower refractive index than the refractive index of the light guiding plate 1, so that light emitted from the side-entry backlight may be fully reflected at an interface between the light guiding plate 1 and the low-refractive-index layer 6, further preventing light from escaping.

A third polarizer 23 is disposed on the upper side of the low-refractive-index layer 6. The polarization direction of the third polarizer 23 is the same as the polarization direction of the first polarizer 21. When the brightness of the ambient light is large, the light incident on the front surface of the reflective liquid crystal display panel may be ambient light, and the ambient light functions as a light source for display. When the brightness of the ambient light is low, in a front light source mode, light entering the light guiding plate 1 from the side is non-polarized light. The third polarizer 23 allows only light with a polarization direction parallel thereto to pass through it, and will filter off light of other polarization directions, thereby reducing escaping light by 50%. Optionally, the surface of the third polarizer 23 has a microstructure. For example, the third polarizer 23 may be performed with a sanding treatment to form the microstructure on the surface to dissipate the surface reflection in the ambient light source mode.

A composite layer 7 is provided on the upper side of the third polarizer 23. The composite layer 7 is a composite layer having a mixture of liquid crystals and dichroic dyes. The composite layer 7 includes liquid crystal molecules (master) and dichroic dye molecules (guest) dissolved in the liquid crystal molecules (master). The polarization direction of the polarized light entering the composite layer 7 is parallel to the slow axis of the dichroic dyes and the light is absorbed by the dyes, otherwise, the light is transmitted through it. A voltage or no voltage is applied to the composite layer 7 such that the light absorption axis 8 is orthogonal to the light absorption axis 8 of the third polarizer 23 in the display dark state. Therefore, the escape of light can be completely avoided, and the contrast can be improved.

A third substrate 33 is further provided on the outer side of the composite layer 7, and the third substrate 33 is a transparent substrate such as a glass substrate.

The display panel of the embodiment of the present disclosure may further include a conventional circuit for driving the display panel to have a display function, details of which will not be repeated herein.

Hereinafter, taking the liquid crystals in the composite layer 7 being positive liquid crystals, and the dichroic dyes being positive dyes (p-type dyes) as an example, and the working principle of the display panel of the embodiment of the present disclosure in a display bright state and a display dark state will be explained. However, those skilled in the art can understand that the liquid crystals in the composite layer 7 can also be negative liquid crystals, and the dyes can also be negative dyes (n-type dyes), or the liquid crystals in the composite layer 7 are positive liquid crystals, and the dyes are negative dyes, or the liquid crystals in the composite layer 7 are negative liquid crystals, and the dyes are positive dyes. As long as the light absorption axis 8 of the composite layer 7 is orthogonal to the third polarizer 23, the objective of the present disclosure can be achieved.

Figure 3:
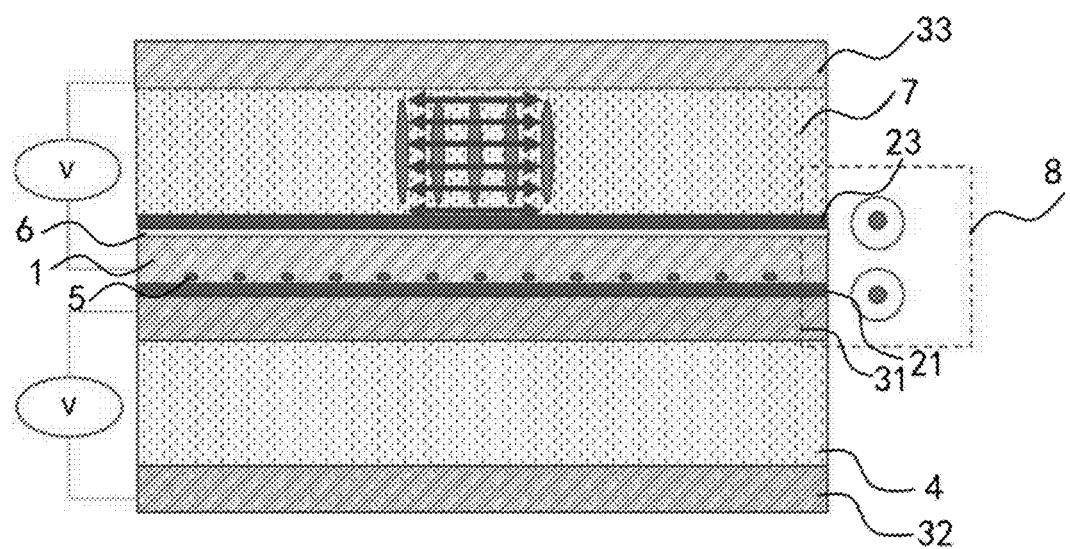
FIG. 3 is a schematic diagram of a bright state optical path of a reflective liquid crystal display panel according to one or more embodiments of the present disclosure.

FIG. 3 is a schematic diagram of a display bright state optical path, in which the polarization direction of the polarized light emitted out of the reflective liquid crystal display panel is parallel to the display panel. At this time, the light absorption axis 8 of the dichroic dyes is driven to be perpendicular to the substrates 31, 32, and 33, and the polarized light emitted out will not be absorbed by the dyes, and will be transmitted through the dyes for normal display.

Figure 4:
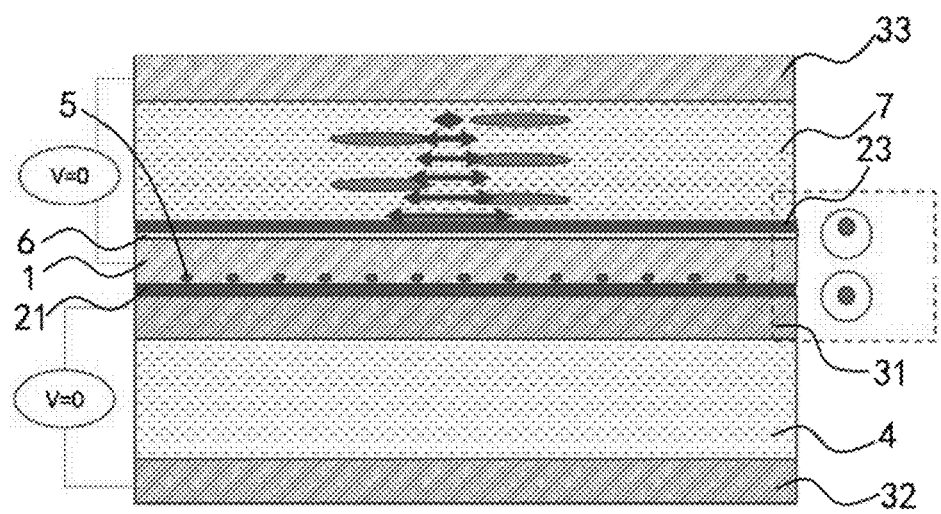
FIG. 4 is a schematic view showing a dark state optical path of a reflective liquid crystal display panel according to one or more embodiments of the present disclosure.

FIG. 4 is a view showing a display dark state light path, in which the polarization direction of the polarized light emitted out of the reflective liquid crystal display panel is perpendicular to the display panel, and cannot be transmitted through the first polarizer 21. The polarization direction of the escape light passing through the third polarizer 23 is parallel to the display panel, and since the polarization direction of the escape light is parallel to the light absorption axis 8 of the dichroic dyes, the escape light is absorbed by the dyes, and cannot be emitted out, thereby completely eliminating the influence of the escape light on the display dark state, and greatly improving the contrast of the reflective liquid crystal display panel.

Optionally, an embodiment of the present disclosure further provides a display device, which may include the display panel described above. The display device may be any product or part that has a display function, such as an electronic paper, a mobile phone, a tablet computer, a television, a display, a notebook computer, a digital photo frame, a navigation device.

The present disclosure may, of course, be embodied in a variety of other embodiments without departing from the spirit and scope of the present disclosure. Modifications and variations are intended to be covered within the scope of the appended claims. Further, a low-refractive-index layer is disposed between the light guiding plate and the polarizer, so that light that is incident into the light guiding plate can be fully reflected at an interface between the light guiding plate and the low-refractive-index layer. Thereby it can further prevent light from escaping, and further improve the contrast.

What is claimed is:

1. A reflective liquid crystal display panel, comprising:
a first substrate;
a second substrate disposed opposite to the first substrate;
a first polarizer disposed on a side of the first substrate away from the second substrate;
a second polarizer disposed on a side of the second substrate away from the first substrate;
liquid crystals filled between the first substrate and the second substrate;
a light guiding plate having light guiding dots disposed on a side of the first polarizer away from the first substrate;
a side-entry backlight;
a third polarizer laminated on a side of the light guiding plate away from the first polarizer, and having the same polarization direction as the first polarizer;
a composite layer having a mixture of liquid crystals and dichroic dyes; and
a third substrate, wherein a light absorption axis of the third polarizer is orthogonal to a light absorption axis of the composite layer in a display dark state.

2. The reflective liquid crystal display panel according to claim 1, wherein a low-refractive-index layer is further disposed between the light guiding plate and the third polarizer, and the low-refractive-index layer has a refractive index lower than a refractive index of the light guiding plate.

3. The reflective liquid crystal display panel according to claim 1, wherein the light guiding plate is a glass light guiding plate.

4. The reflective liquid crystal display panel according to claim 1, wherein the third polarizer has a microstructure to eliminate reflection.

5. The reflective liquid crystal display panel according to claim 1, wherein the dichroic dyes are p-type dyes or n-type dyes.

6. The reflective liquid crystal display panel according to claim 1, wherein the liquid crystals in the composite layer are positive liquid crystals or negative liquid crystals.

7. A method for manufacturing a reflective display panel, comprising:
providing a first substrate;
providing a second substrate opposite to the first substrate;
providing a first polarizer on a side of the first substrate away from the second substrate;
providing a second polarizer on a side of the second substrate away from the first substrate;
filling liquid crystals between the first substrate and the second substrate;
providing a light guiding plate having light guiding dots on a side of the first polarizer away from the first substrate;
providing a third polarizer on a side of the light guiding plate away from the first polarizer;
providing a composite layer having liquid crystals and dichroic dyes on a side of the third polarizer away from the light guiding plate;
providing a third substrate on a side of the composite layer away from the third polarizer; and
providing a side-entry backlight; wherein the third polarizer has the same polarization direction as the first polarizer, and a light absorption axis of the third polarizer is orthogonal to a light absorption axis of the composite layer in a display dark state.

8. The method according to claim 7, further comprising providing a low-refractive-index layer between the light guiding plate and the third polarizer before disposing the third polarizer, wherein the low-refractive-index layer has a refractive index lower than a refractive index of the light guiding plate.

9. The method according to claim 7, further comprising performing a sanding treatment on the third polarizer before the step of disposing the third polarizer.

10. A display device, comprising:
a reflective liquid crystal display panel comprising:
a first substrate;
a second substrate disposed opposite to the first substrate;
a first polarizer disposed on a side of the first substrate away from the second substrate;
a second polarizer disposed on a side of the second substrate away from the first substrate;
liquid crystals filled between the first substrate and the second substrate;

a light guiding plate having light guiding dots disposed on a side of the first polarizer away from the first substrate;

a side-entry backlight;

a third polarizer laminated on a side of the light guiding plate away from the first polarizer, and having the same polarization direction as the first polarizer;

a composite layer having a mixture of liquid crystals and dichroic dyes; and a third substrate, wherein a light absorption axis of the third polarizer is orthogonal to a light absorption axis of the composite layer in a display dark state.

11. The display device according to claim 10, wherein a low-refractive-index layer is further disposed between the light guiding plate and the third polarizer, and the low-refractive-index layer has a refractive index lower than a refractive index of the light guiding plate.

12. The display device according to claim 10, wherein the light guiding plate is a glass light guiding plate.

13. The display device according to claim 10, wherein the third polarizer has a microstructure to eliminate reflection.

14. The display device according to claim 10, wherein the dichroic dyes are p-type dyes or n-type dyes.

15. The display device according to claim 10, wherein the liquid crystals in the composite layer are positive liquid crystals or negative liquid crystals.

* * * * *